United States Patent
Tajuddin

(10) Patent No.: US 9,519,629 B1
(45) Date of Patent: Dec. 13, 2016

(54) STYLE CONSOLIDATION AND OPTIMIZATION WITH STRONG OWNERSHIP

(75) Inventor: Brian J. Tajuddin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 630 days.

(21) Appl. No.: 13/567,713

(22) Filed: Aug. 6, 2012

(51) Int. Cl.
  *G06F 17/00* (2006.01)
  *G06F 17/22* (2006.01)
  *G06F 17/21* (2006.01)

(52) U.S. Cl.
  CPC .......... *G06F 17/227* (2013.01); *G06F 17/212* (2013.01); *G06F 17/214* (2013.01); *G06F 17/218* (2013.01); *G06F 17/2247* (2013.01)

(58) Field of Classification Search
  CPC .... G06F 17/212; G06F 17/214; G06F 17/218; G06F 17/2247; G06F 17/227
  USPC ........................................ 715/234, 235, 236
  See application file for complete search history.

(56) References Cited

U.S. PATENT DOCUMENTS

| | | | | |
|---|---|---|---|---|
| 8,307,045 | B1 * | 11/2012 | Shmulevich et al. | 709/217 |
| 8,745,027 | B1 * | 6/2014 | Haustein | G06F 17/248 |
| | | | | 715/205 |
| 2006/0236223 | A1 * | 10/2006 | Aubert et al. | 715/513 |
| 2007/0276829 | A1 * | 11/2007 | Wang et al. | 707/7 |
| 2008/0313659 | A1 * | 12/2008 | Eide | G06F 17/2247 |
| | | | | 719/328 |
| 2009/0300483 | A1 * | 12/2009 | Viet | 715/236 |
| 2011/0099467 | A1 * | 4/2011 | Kapur | H04L 67/32 |
| | | | | 715/236 |
| 2012/0278700 | A1 * | 11/2012 | Sullivan et al. | 715/235 |
| 2013/0159839 | A1 * | 6/2013 | Joffray | G06F 17/2252 |
| | | | | 715/235 |

* cited by examiner

*Primary Examiner* — Chau Nguyen

(74) *Attorney, Agent, or Firm* — Lee & Hayes, PLLC

(57) ABSTRACT

Techniques are described for optimizing and consolidating style files for formatted pages of data such as web pages. Styles may be consolidated through the identification of common rules shared by multiple styles, and the common rules may be incorporated into a common style that has the style mappings and/or namespace of the source styles. Consolidation may enable minimal style information to be sent in response to a page request, the style information corresponding to a requesting browser type and/or version. Embodiments may also provide for global constants in style rules, with global constant resolution performed dynamically at runtime. Embodiments may also support file splitting for optimal browser performance, with the style file splitting performed dynamically at runtime.

20 Claims, 5 Drawing Sheets

STYLE CONSOLIDATION AND OPTIMIZATION WITH STRONG OWNERSHIP

BACKGROUND

Software development organizations face many challenges related to managing the code and other information needed to deploy software-based solutions. One such challenge is the management of style information used to manage the appearance or other stylistic aspects of a user interface. In some cases, a business may experience rapid growth that leads to less than optimal organization of style information by a development organization responsible for creating and maintaining an online presence for the business.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
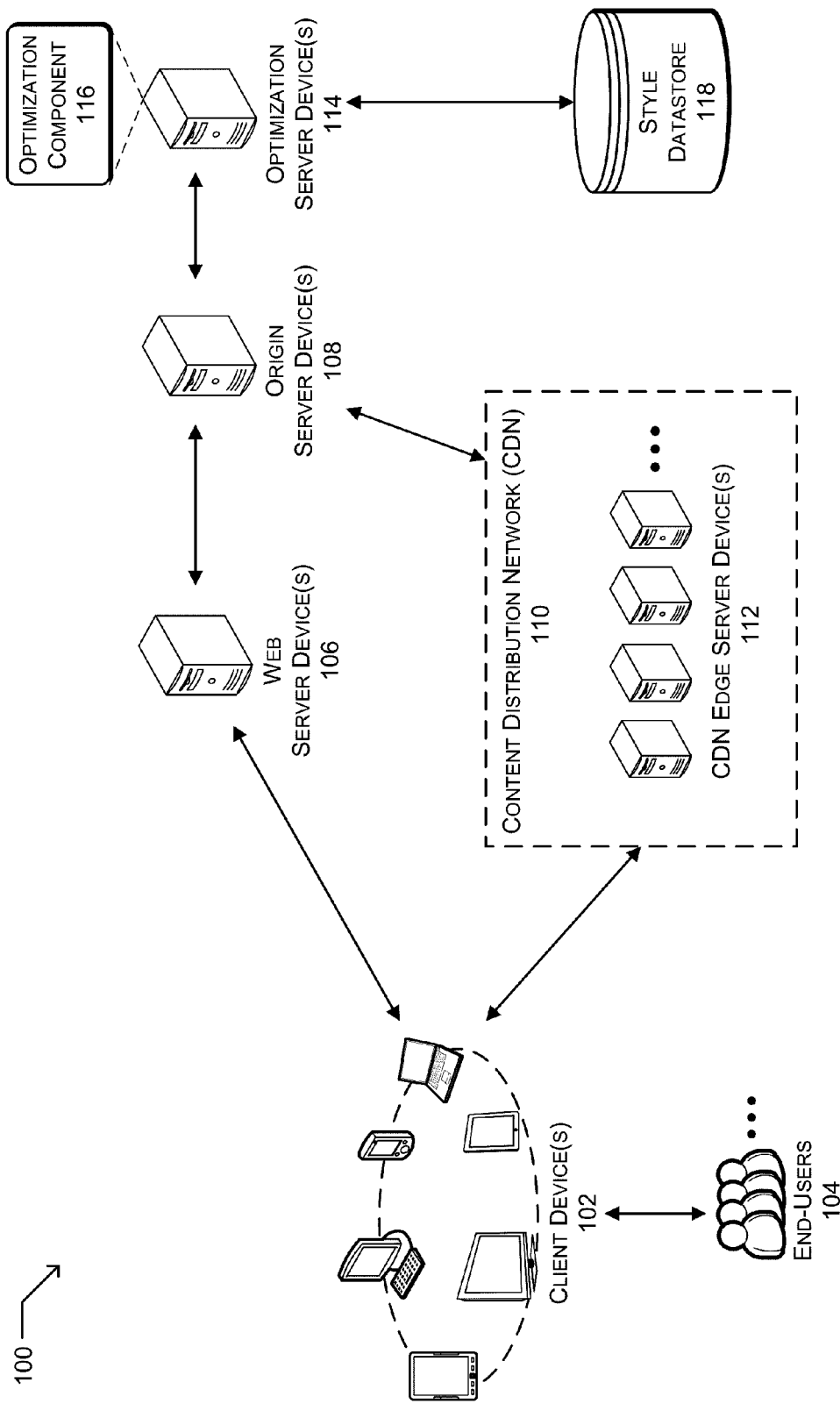
FIG. 1 depicts an example environment in which embodiments may operate to consolidate and/or optimize style information for a software system.

Embodiments are described for consolidating and optimizing styles across one or more pages, and providing the consolidated and optimized styles in response to page requests. As used herein, a page may be any type of rendered interface or display, including but not limited to web pages, web sites, portions of web sites, applications, apps, or user interfaces. Pages may include interactive content or non-interactive content. Embodiments provide for the consolidation and optimization of style information included in cascading style sheet (CSS) files. However, embodiments are not so limited, and embodiments support the consolidation and optimization of style information in other formats, including other formats that have a similar hierarchical organization to that of CSS.

In some embodiments, an indication may be received of a plurality of styles (e.g., CSS files) associated with one or more pages. In some cases, the style information may be hierarchically organized as including a namespace that is associated with a particular owner, such as an individual, entity, or organization within a larger business organization. The namespace may include one or more styles, each with a name. In embodiments that support the CSS format, a style is associated with a class. Each of the one or more styles in a namespace may be associated with one or more style mappings that may provide some criteria or limitation on the use of the style. For example, a style may be associated with a style mapping that indicates a browser type and/or version (e.g., Internet Explorer (IE) version 8). In such cases, the style may be provided in response to page requests received from that particular browser type and/or version. As used herein, browser may describe any type of process or application that requests data to be delivered over a network, including but not limited to a web browser, internet service client application, user application, app, or other process.

Other examples of style mappings may include geographical location, device type (e.g., mobile device, smartphone, laptop, desktop, tablet, reader, etc.), language, or mappings for particular web sites. Style mappings may also include mappings for types of applications, or for particular applications. Further each style with its style mapping(s) may include one or more rules. In some cases, each rule includes a name and a value associated with the name. For example, a "link" style may include a name/value pair of "color: #0000FF," indicating that the color of a link on a page is blue for a particular style.

Embodiments may operate to analyze the various styles across one or more pages and identify one or more common rules shared by at least some of the styles. A common style may then be created to include the common rules, and the common style may be associated with a style mapping (e.g., browser type and/or version) based on the original styles. An example of such style consolidation is provided by Tables 1 and 2.

For example, Table 1 lists three styles that may be input to a consolidation process provided by embodiments. Styles 1 and 2 have a style mapping "for all browsers," whereas Style 3 has a style mapping "for IE," indicating that Style 3 is to be provided in response to page requests received from an IE browser.

TABLE 1

| Style 1 | For all browsers:<br>.link {<br>   color: #000FF;<br>   text-decoration: underline;<br>} |
|---|---|
| Style 2 | For all browsers:<br>.strong {<br>   color: #0000FF;<br>   font-weight: bold;<br>} |
| Style 3 | For IE:<br>.strong {<br>   font-weight: bolder;<br>} |

Table 2 lists two common styles created by consolidation of the three input styles of Table 1, based on identification of common rules in the three input styles.

TABLE 2

| Common Style 1 | For non-IE browsers:<br>.link, .strong { color: #000FF; }<br>.strong { font-weight: bold; }<br>.link { text-decoration: underline; } |
|---|---|
| Common Style 2 | For IE:<br>.link, .strong { color: #0000FF; }<br>.strong { font-weight: bolder; }<br>.link { text-decoration: underline; } |

As shown in the example of Table 2, two common styles have been created: Common Style 1 with style mapping "for non-IE browsers" and Common Style 2 with style mapping "for IE." Common Style 1 may be provided in response to page requests from non-IE browsers, and Common Style 2 may be provided in response to page requests from IE browsers. Because each style may be included in a file (e.g., a CSS file) downloaded to a browser to satisfy a page request, consolidation of files may reduce the size and/or number of files downloaded to a browser, thus allowing faster display of the page by a browser. Consolidation of style files may also reduce the storage space needed to store style information on a web server, origin server, or other device.

In some embodiments, an owner may be associated with the common style and/or with a namespace that includes the common style, to enable a responsible party to be contacted readily in the event that the style is to be altered or used in a new page or site. The owner may be an individual (e.g., a developer, program manager, and the like), organization or group of individuals (e.g., such as a development team or business organization within a business), or other entity (e.g., such as a particular computing device).

Moreover, in some embodiments one or more global constants may be created to identify values within rules of the common styles, where a global constant maps to a value for a color, a font, or an image URL that may be used throughout one or more pages. For example, a business organization may define a global constant of xyz-blue=#0000FF for the particular shade of blue that is preferred in the organization's page(s). Then, xyz-blue may be included in rules for the common styles used in the page(s) (e.g., .link {color: xyz-blue}). Such global constants may be resolved dynamically at run-time when a page request is received, through a table look-up or by accessing some other type of data structure storing the global constant data.

As another example, a business organization may define a global constant of xyz-strong-font=Futura Medium, and xyz-strong-font may be included in rules for the common styles used in page(s) (e.g., .strong {font: xyz-strong-font}). Embodiments support use of a global constant for various font properties, including but not limited to font family, font weight, font style, font stretch, font size, and so forth.

Moreover, embodiments may support other types of global constants. For example, a constant may be created to identify a particular image (e.g., xyz-logo), and that constant may map to a location for the image (e.g., xyz-logo=http://server.xyz.com/images/logo.jpg). The global constant corresponding to the image location may then be used in style rules instead of the full location for the image. Moreover, global constants may also be used to point to sprites (e.g., combinations of images) as well as to individual images. Use of such global constants (e.g., for colors, images, or other values) may provide for more efficient maintenance, given that a value for the constant may be changed once in the look-up table to propagate the change throughout one or more pages.

In some cases, one or more legacy styles associated with one or more pages may be migrated to a set of common, consolidated, optimized styles and stored, as described herein. The common styles may then be provided in response to page requests. In some embodiments, on receiving a request for a page, a common style with a style mapping corresponding to the request may be dynamically determined. For example, in response to a request received from an IE browser, the common style(s) with style mappings "for IE" may be identified. Moreover, in cases where the common style(s) include rules within global constants, the constants may be resolved dynamically by look-ups to tables or other data storage. The common style(s) may then be provided to the browser in response to the page request.

Many browsers are able to make multiple connections to a server to request information, and different types of browsers may support a different maximum number of such network connections in total and/or to a particular domain. Given that, many web servers split content into multiple files to enable the browser to download content in parallel and therefore faster. To leverage this browser feature, in some embodiments the common style may be dynamically split into multiple files after receiving a page request and prior to delivery of the style information to the browser. Because different browsers may have different limits for total connections and/or connections to a particular domain, such file splitting may vary based on browser type, browser version, and/or other style mapping information.

In some embodiments, once the legacy styles have been migrated to the consolidated, optimized style format, this format may be employed for creation of new styles going forward. In such cases, a new style may not be created unless an owner is identified for the style. Thus, embodiments may enforce strong ownership of styles for one or more pages, to enable any style on the page(s) to be traced to its owner for handling maintenance or deployment issues.

Moreover, because the common styles may be defined with respect to particular style mappings, such as for a particular browser type and/or version, embodiments may also allow for an overall optimization and/or consolidation of style information to accommodate client browsers. Such a system of styles may be centrally managed to provide a high level of performance and/or user experience for supported browsers or other style mapping criteria.

Moreover, some embodiments may also provide for an editing user interface (UI) to allow developers or other individuals the ability to create new styles and preview created styles. In some cases, such an interface may be part of an integrated development environment (IDE) used to create pages (e.g., for a web site). Features within the UI may allow individuals to view existing, optimized styles, and may suggest an optimized style based on a determination that the individual is entering a style that is identical to or substantially similar to an existing style. Thus, embodiments may operate to prevent duplication of styles within a large development organization. The UI may also provide preview functionality, hints, syntax, grammar, or format validation, or other features. Moreover, in some embodiments an editing UI may enable an individual to view and/or manage global constant data for colors, images, sprites, or other constants.

Illustrative Environment

FIG. 1 shows an example environment 100 in which embodiments may operate. In embodiments, the various devices and/or components of environment 100 may communicate with one another and with external devices via one or more networks. Such networks may include public networks such as the Internet, private networks such as an institutional and/or personal intranet, or some combination of private and public networks. The networks may also include any type of wired and/or wireless network, including but not limited to local area networks (LANs), wide area networks (WANs), Wi-Fi, WiMax, and mobile communications networks (e.g. 3G, 4G, and so forth). The networks may utilize communications protocols, including packet-based and/or datagram-based protocols such as internet protocol (IP), transmission control protocol (TCP), user datagram protocol (UDP), or other types of protocols. Moreover, the networks may also include a number of devices that facilitate network communications and/or form a hardware basis for the networks, such as switches, routers, gateways, access points, firewalls, base stations, repeaters, backbone devices, and the like.

In some embodiments, environment 100 includes one or more client device(s) 102 that are owned by, operated by, and/or otherwise associated with end-users 104. Client device(s) 102 may include any type of computing device that is able to communicate with other devices over a network, including but not limited to desktop computers, personal computers, laptop computers, tablet computers, eBook readers, wearable computers, mobile phones, automotive computers, thin clients, terminals, personal data assistants (PDAs), game consoles, mobile gaming devices, and the like. In some embodiments, client device(s) 102 include one or more applications (e.g., a web browser) that send page requests for data (e.g., web pages, etc.) using hypertext transfer protocol (HTTP) or another protocol, receive the requested data from a server, and display information to the end-user based on the received data.

In some embodiments, environment 100 includes one or more server computing devices. Such server devices may include any type of computing device including, but not limited to, network servers, workstations, desktop computers, laptop computers, tablet computers, mobile computing devices, and the like. Further, the server devices shown may include one or more computing devices that operate in a cluster or other grouped configuration to share resources, balance load, increase performance, provide fail-over support or redundancy, or for other purposes. Moreover, the server devices shown may include one or more hardware components and/or one or more software components (e.g., processes and/or applications) to perform tasks as described herein.

As shown in FIG. 1, environment 100 includes web server device(s) 106 and origin server device(s) 108. In some embodiments, web server device(s) 106 operate to receive page requests from client device(s) 102. After receiving a page request, web server device(s) 106 may retrieve the page contents for the requested page from origin server device(s) 108 where content is stored by one or more content providers. In some embodiments, client device(s) 102 may make page requests to a content distribution network (CDN) such as CDN 110. As shown, CDN 110 includes one or more CDN edge server device(s) 112. These edge server devices may receive periodic (or irregularly timed) distributions of content from origin server device(s) 108, and may serve such content is response to requests from client device(s) 102. The various edge server devices of CDN 110 may be geographically distributed to reduce latency or provide other performance benefits when servicing page requests from client device(s) 102. Moreover, in some embodiments CDN 110 and/or web server device(s) 106 may host multiple web sites corresponding to different online merchants or other web services.

Environment 100 may also include optimization server device(s) 114 to perform various operations for style consolidation and/or optimization as described herein. In some embodiments, optimization server device(s) 114 may include an optimization component 116 (e.g., a hardware and/or software component) to perform such operations. Optimization server device(s) 114 and/or optimization component 116 may access style information stored in style datastore 118 to perform consolidation and/or optimization operations. For example, style datastore 118 may store non-optimized, legacy style data to be migrated to one or more consolidated styles as described herein, and the consolidated style data may then be stored in style datastore 118. In embodiments, style datastore 118 may be split into multiple data storage devices (e.g., databases, data warehouses, and the like), and/or may be incorporated into one or more of the servers shown in FIG. 1. Moreover, in some embodiments, operations of optimization server device(s) 114 may be performed at least in part by other servers in environment 100, such as origin server device(s) 108, web server device(s) 106, and/or CDN edge server device(s) 112.

Illustrative Computing Device Architecture

Figure 2:
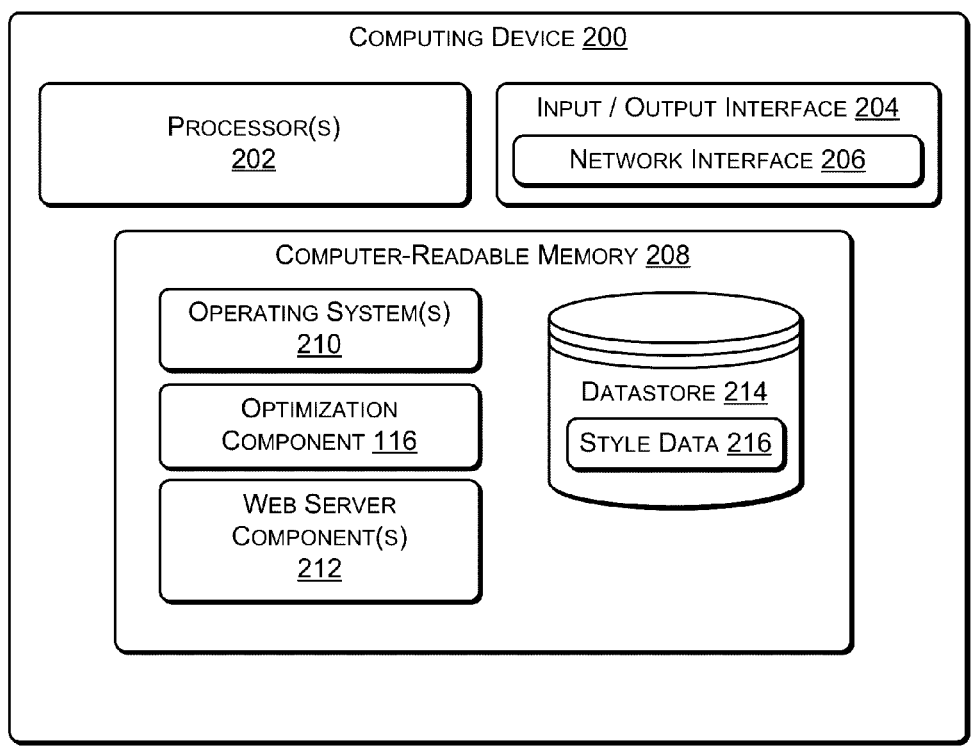
FIG. 2 depicts an example computing device for consolidating and/or optimizing style information, according to embodiments.

FIG. 2 depicts an example computing device 200 that may be used to implement various embodiments described herein. For example, computing device 200 may provide an example computing system architecture for optimization server device(s) 114, or other devices of environment 100. In embodiments, computing device 200 includes one or more processors 202. Processor(s) 202 may be implemented as hardware, software, or some combination thereof. Processor(s) 202 may also include computer-executable, processor-executable, and/or machine-executable instructions written in any suitable programming language to perform various functions described herein.

Computing device 200 may further include one or more input/output interfaces 204 to allow computing device 200 to communicate with other devices such as user input peripheral devices (e.g., a keyboard, a mouse, a pen, a game controller, a voice input device, a touch input device, gestural input device, and the like), and/or output peripheral devices (e.g., a display, a printer, audio speakers, a haptic output, and the like).

Input/output interface 204 may also include one or more network interfaces 206 to enable communications between computing device 200 and other networked devices such as those depicted in FIG. 1. Such network interfaces 206 may include one or more network interface controllers (NICs) or other type of transceiver device to send and receive communications over a network. Computing device 200 may also include one or more busses and/or other internal communications hardware or software that allow for the transfer of data and/or internal communications between the various components of computing device 200.

As shown in FIG. 2, computing device 200 includes a computer-readable memory 208, which may include volatile memory such as random access memory (RAM), static random access memory (SRAM), dynamic random access memory (DRAM), cache memory, and the like. computer-readable memory 208 may also include non-volatile memory such as read only memory (ROM), flash memory, and the like. Moreover, computer-readable memory 208 may also include cache memory, active memory, and/or physical memory used by various processes that run based on instructions and data stored on computing device 200.

Computer-readable memory 208 includes computer-readable storage media, which is a form of computer-readable media. Computer-readable storage media may include non-removable storage (e.g., a hard drive) and/or removable storage including magnetic disk storage, optical disk storage, tape storage, storage arrays, storage area networks, network attached storage, cloud storage, and the like. Disk drives and associated computer-readable media may provide non-volatile storage of computer readable instructions, data structures, program modules, and other data for the operation of computing device 200.

As used herein, computer-readable media includes two distinct types of media: storage media and communications media. With regard to storage media, embodiments may be provided as a computer program product stored on a non-transitory computer-readable or machine-readable storage medium. Computer-readable storage media or machine-readable storage media includes tangible and/or non-transitory forms of media such as volatile and/or non-volatile memory. Such media may be included in a device and/or hardware component that is part of a device or external to a device, including but not limited to RAM, SRAM, DRAM, ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store and maintain information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible storage media does not include non-tangible communication media.

In some embodiments, computer-readable memory 208 includes one or more executing operating systems (OS) 210, and one or more stored and/or executing processes including components, programs, or applications that are loadable and executable by processor(s) 202. In the example shown, memory 208 includes optimization component 116 that performs operations for consolidation and optimization of style data as described herein. Memory 208 may also include one or more web server components 212 that provide data in response to page requests, e.g., in cases where computing device 200 represents a web server. In some embodiments, computer-readable memory 208 also includes a datastore 214 (e.g., a database) to store information for operations of computing device 200. For example, datastore 214 may store style data 216 for style data optimization and consolidation operations.

Illustrative Style Data Organization

Figure 3:
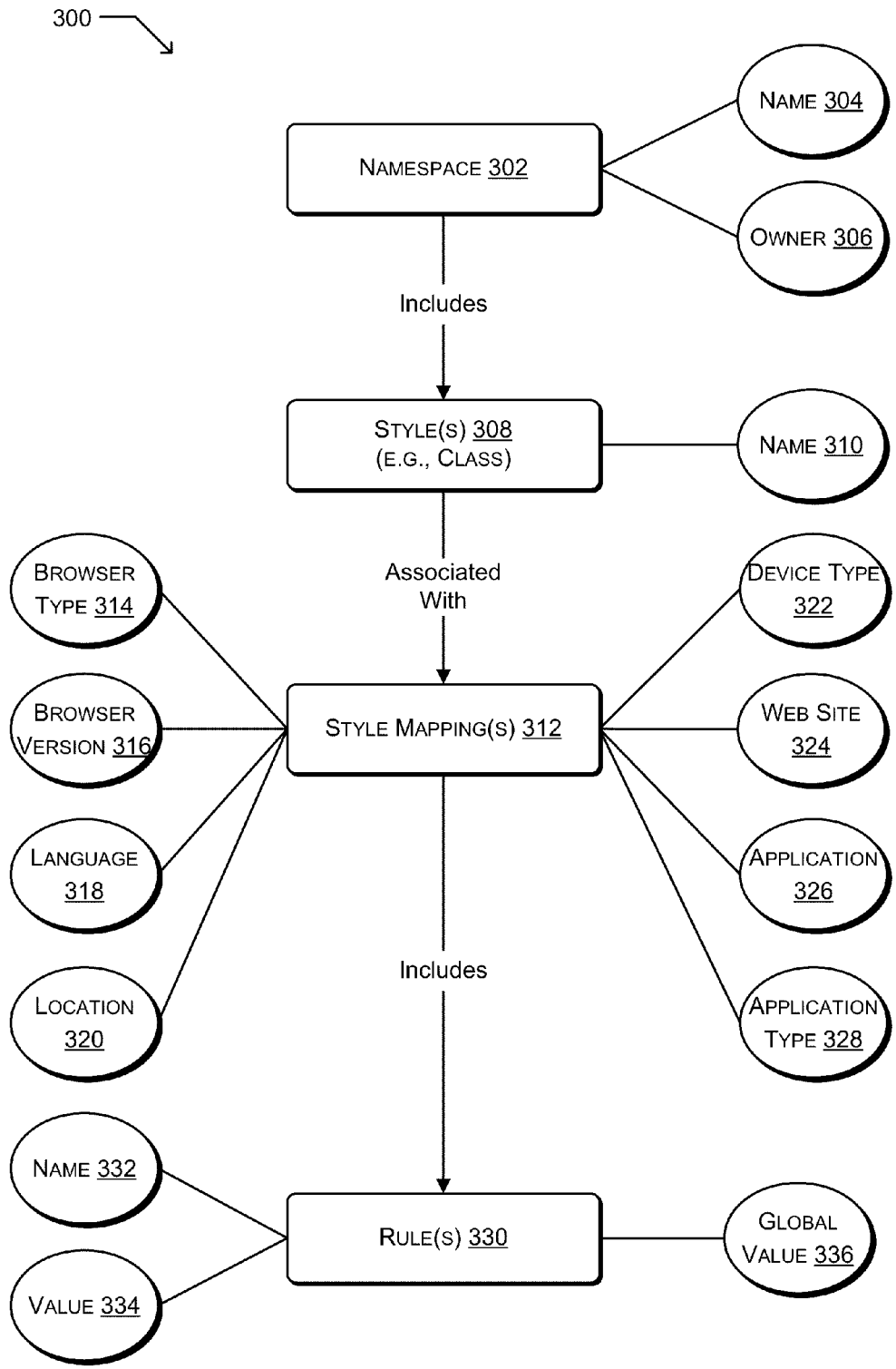
FIG. 3 depicts an entity relationship diagram for style information, according to embodiments.

FIG. 3 depicts an entity relationship diagram 300 for style data organization, according to embodiments. Embodiments may analyze, consolidate, and/or optimize style information that is hierarchically organized as shown in FIG. 3, for example in CSS format. In the example shown, the style hierarchy includes a namespace 302 with a name 304 and an owner 306. The namespace may include one or more styles 308, each with a name 310. In cases where styles information is in the CSS format, a style is associated with a CSS class.

As further shown in the example of FIG. 3, each of the one of more styles in a namespace may be associated with one or more style mappings 312 that provide criteria for the use of the style. For example, a style may be associated with a style mapping that indicates a browser type 314, browser version 316, language 318, location 320 (e.g. geographical location), device type 322, web site 324, application 326, and/or application type 328. In such cases, the style may be provided in response to page requests received from clients corresponding to one or more of the style mappings (e.g., from a mobile device in a particular location supporting a particular language and running a particular browser, and so forth). Each style with its style mapping(s) may includes one or more rules 330, that are pairings of name 332 and value 334 as shown in the examples of Tables 1 and 2 above (e.g., "color: #0000FF"). In some embodiments, rules 330 may also include a global value 336 that is resolved dynamically following a page request, as described further below.

Illustrative Process

Figure 4:
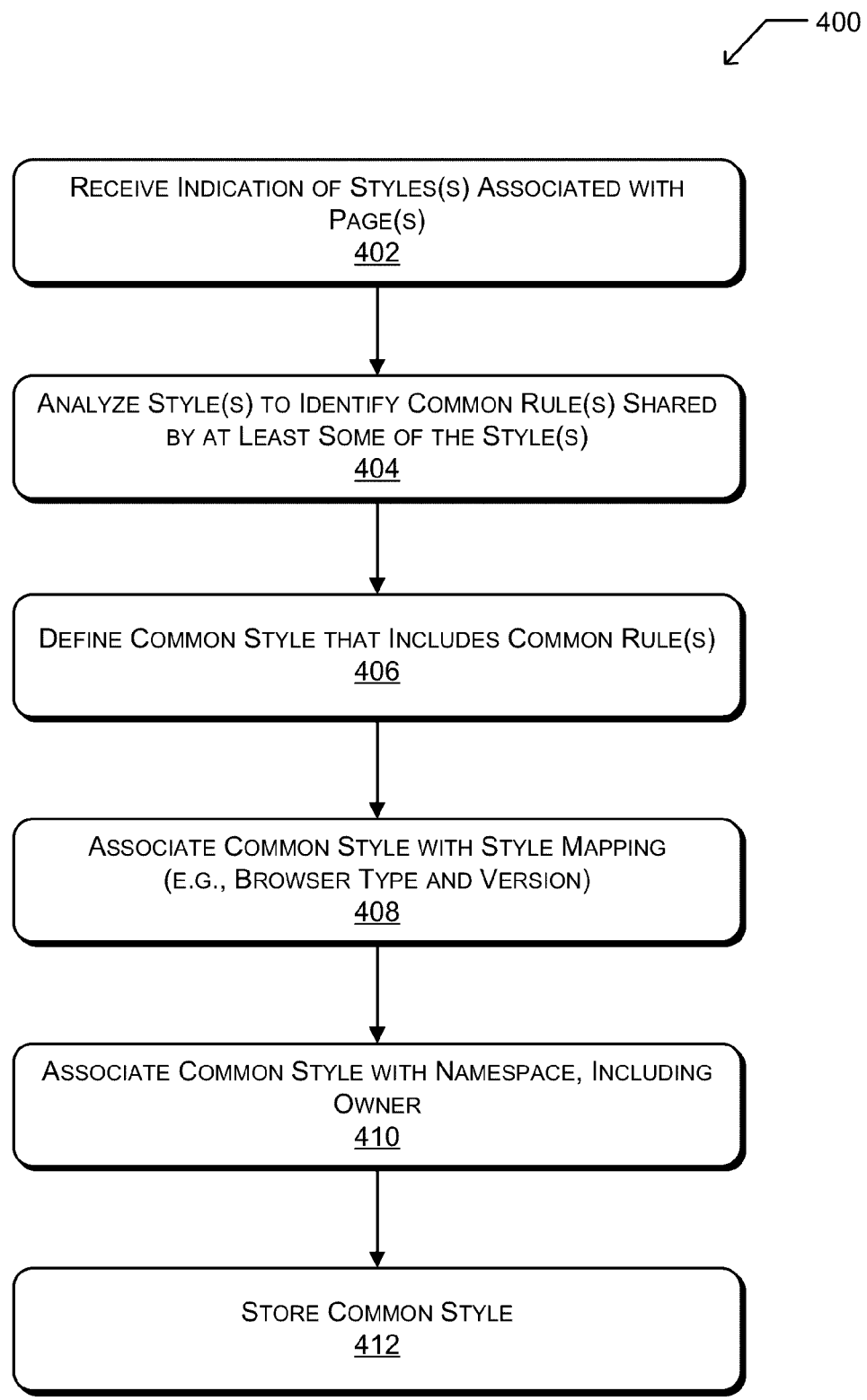
FIG. 4 depicts a flow diagram of an example process for consolidating and/or optimizing style information, according to embodiments.
Figure 5:
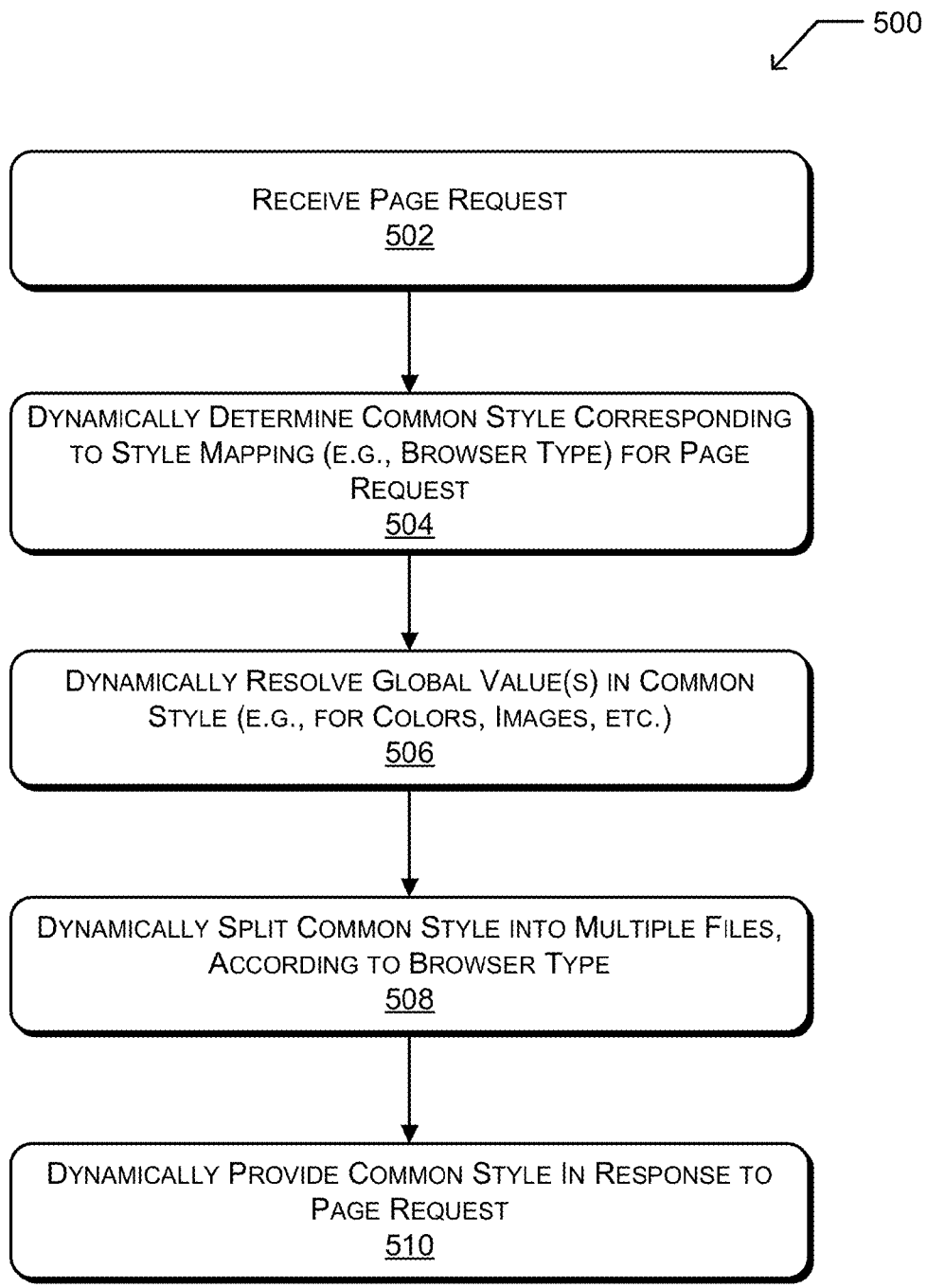
FIG. 5 depicts a flow diagram of an example process for dynamically providing optimized style data in response to a request, according to embodiments.

FIGS. 4 and 5 depict flowcharts for an example processes in accordance with various embodiments. The operations of the example processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular data types. The order in which the operations are described is not intended to be construed as a limitation, and any number of the described operations may be executed in any order, combined in any order, subdivided into multiple sub-operations, and/or executed in parallel to implement the described process. In some embodiments, the processes shown in FIGS. 4 and 5 may be performed at least in part by optimization component 116 of optimization server device(s) 114.

FIG. 4 depicts a flow diagram of an example process 400 for consolidating and/or optimizing style information, according to embodiments. At 402, an indication may be received one or more styles associated with one or more pages. In some embodiments, the page(s) may be hosted on web server device(s) 106 and/or CDN 110, and/or may include e-commerce sites for one or more online merchants. In some embodiments, the styles may be included in a same namespace that is associated with a particular owner individual, entity, or organization, and process 400 may operate to optimize and consolidate those styles for optimal serving of page(s).

At 404, the styles may be analyzed to identify one or more common rules that are shared by at least some of the styles. In some embodiments, this may include parsing and textual analysis of the text of the style files (e.g., CSS files) to identify at least partial matches in the name/value pairs across multiple files, and storing these matching name/value pairs as common rules. At 406, a common style is defined to include the common rules identified at 404.

At 408, the common style may be associated with one or more style mapping attributes based on the style mappings for the identified common rules. For example, if at set of matching rules had a style mapping of "for IE," then the common rule created may be associated with a style mapping of "for IE." At 410, the common style may be associated with the namespace of the original styles, and thus associated with the owner of the namespace. At 412, the common style is stored for subsequent use, e.g., to provide in response to page requests.

In some embodiments, process 400 runs in a batch mode or otherwise offline to process legacy style information into an optimized set of common styles. Such a process may be scheduled to run periodically or otherwise, as an automatic or manual job, to process legacy style information. In some embodiments, style information updates may be received and tracked and process 400 may executed when a certain threshold number of updates are detected. Such incremental processing of style information into optimized style information may prevent the process from running too frequently and consuming computational resources on optimization server device(s) 114.

FIG. 5 depicts a flow diagram of an example process 500 for dynamically providing optimized style data in response to a request, according to embodiments. At 502, a page request is received. In some embodiments, the page request may be received from a browser on one of client device(s) 102. In some embodiments, the page request may be received from a different type of application executing on a client device, such as a work processing application, spreadsheet application, game, multimedia player, chat or messaging program, electronic book reader application, or other application.

In response to the page request, at 504 a dynamic determination is made of a common style that has a style mapping corresponding to attributes of the requestor (e.g., corresponding in browser type, browser version, application type, particular application, and so forth). At 506, the files for the corresponding common style may be retrieved from storage and any global values included in the rules of the common style may be resolved by looking up the global values in a table or other data storage.

As describe above, in some embodiments the style file may be split into multiple files prior to delivery to the browser, to enable optimal browser performance. At 508, the splitting may be performed dynamically according to the browser type, browser version, and/or other style mapping attributes. At 510, the common style is dynamically provided to the requesting client in response to the request for the page. In some embodiments, one or more of the operations of process 500 may be performed dynamically (e.g., at the time of the page request), and the common style file(s) may be delivered to the web server device(s) 106 or CDN 110 for delivery to the client's browser. In some cases, the style file(s) may be cached on web server or CDN for a certain period of time, to at least partly mitigate the performance degradation caused by the dynamic global constant resolution and/or file splitting.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method, comprising:
receiving an indication of a plurality of styles associated with one or more pages, individual styles of the plurality of styles including a style name and one or more rules, and individual styles of the plurality of styles defined in a cascading style sheet (CSS) file;
analyzing the plurality of styles to identify at least one common rule shared by at least some of the plurality of styles;
combining the at least one common rule shared by at least some of the plurality of styles to define a common style that includes the at least one common rule, the common style associated with a browser type;
associating the common style that includes the at least one common rule and is associated with the browser type with an owner of the common style that is at least one of an individual, an entity, or an organization responsible for the common style; and
dynamically providing the common style that includes the at least one common rule and is associated with the browser type in response to a request for at least one of the one or more pages, the request being received from a browser of the browser type.

2. The method of claim 1, wherein the at least one common rule includes at least one global value to be used throughout the one or more pages.

3. The method of claim 2, wherein the at least one global value includes a global reference to at least one of an image, a font, or a color.

4. The method of claim 1, wherein individual rules of the one or more rules includes a name and a value associated with the name.

5. The method of claim 1, wherein dynamically providing the common style includes dynamically resolving the reference.

6. The method of claim 1, wherein the common style is defined in a class of the cascading style sheet file.

7. The method of claim 1, wherein the common style is associated with a style mapping that is particular to at least one of the browser type, a geographical location, a device type, a language, an application, an application type, or a web site.

8. The method of claim 1, wherein dynamically providing the common style in response to the request includes splitting the common style into a number of files based on the browser type.

9. The method of claim 1, wherein analyzing the plurality of styles comprises parsing a text of one or more cascading style sheet files to identify at least partial matches in the style name and one or more rules.

10. A system comprising:
one or more memories;
one or more hardware processors in communication with the one or more memories; and
an optimization component stored in the one or more memories and executed by the at least one processor to:
analyze a plurality of styles associated with one or more pages, to identify at least one common rule shared by at least some of the plurality of styles, the plurality of styles defined in a cascading style sheet file and including one or more rules;
combine the at least one common rule shared by at least some of the plurality of styles to define a common style that includes the at least one common rule;
associate the common style that includes the at least one common rule with an owner of the common style that is at least one of an individual, an entity, or an organization responsible for the common style; and dynamically provide the common style that includes the at least one common rule in response to a request for at least one of the one or more pages.

11. The system of claim 10, wherein the common style is included in a namespace that is associated with an owner, the owner being at least one of an individual, an entity, or an organization that is at least partly responsible for the namespace.

12. The system of claim 10, wherein the common style is defined as a class in a cascading style sheet (CSS).

13. The system of claim 10, wherein the common style is associated with a style mapping that is particular to at least one of a browser type, a geographical location, a device type, a language, an application, an application type, or a web site.

14. The system of claim 10, wherein:
the common style is associated with a style mapping that is particular to a browser type;
the request is received from a browser of the browser type; and
dynamically providing the common style includes splitting the common style into a number of files based on the browser type.

15. The system of claim 10, wherein the at least one common rule includes at least one global value to be used throughout the one or more pages, the at least one global value being a reference to at least one of an image, a font, or a color.

16. The system of claim 15, wherein dynamically providing the common style includes dynamically resolving the reference.

17. One or more computer-readable storage media storing instructions that, when executed, instruct at least one processor to perform actions comprising:

analyzing a plurality of styles associated with one or more pages, to identify at least one common rule shared by at least some of the plurality of styles, the plurality of styles including one or more rules and defined in a cascading style sheet file;

combining the at least one common rule shared by at least some of the plurality of styles to define a common style that includes the at least one common rule, the common style associated with a browser type;

associate the common style that includes the at least one common rule with an owner of the common style that is at least one of an individual, an entity, or an organization responsible for the common style; and dynamically providing the common style that includes the at least one common rule and is associated with the browser type in response to a request for at least one of the one or more pages, the request being received from a browser of the browser type.

18. The one or more computer-readable storage media of claim 17, wherein dynamically providing the common style in response to the request includes splitting the common style into a number of files based on the browser type.

19. The one or more computer-readable storage media of claim 17, wherein the common style is included in a namespace that is associated with an owner, the owner being at least one of an individual, an entity, or an organization that is at least partly responsible for the namespace.

20. The one or more computer-readable storage media of claim 17, wherein the at least one common rule includes at least one global value to be used throughout the one or more pages, the at least one global value being a reference to at least one of an image, a font, or a color, and wherein dynamically providing the common style includes dynamically resolving the reference.

* * * * *